United States Patent [19]

Terasaki

[11] Patent Number: 5,646,931
[45] Date of Patent: Jul. 8, 1997

[54] RECORDING MEDIUM REPRODUCTION APPARATUS AND RECORDING MEDIUM REPRODUCTION METHOD FOR SELECTING, MIXING AND OUTPUTTING ARBITRARY TWO STREAMS FROM MEDIUM INCLUDING A PLURALITY OF HIGH EFFIENCY-ENCODED SOUND STREAMS RECORDED THEREON

[75] Inventor: Setsuo Terasaki, Kamakura, Japan

[73] Assignee: Kabushiki Kaisha Toshiba, Kawasaki, Japan

[21] Appl. No.: 417,254

[22] Filed: Apr. 5, 1995

[30] Foreign Application Priority Data

Apr. 8, 1994 [JP] Japan .................... 6-070899

[51] Int. Cl.$^6$ .................................................. G11B 7/00
[52] U.S. Cl. .......................... 369/124; 369/49; 369/59; 348/462; 386/97; 386/99
[58] Field of Search ................ 369/48, 49, 59, 369/54, 124, 60; 348/423, 462; 386/97, 99, 96

[56] References Cited

U.S. PATENT DOCUMENTS

| | | | |
|---|---|---|---|
| 5,055,939 | 10/1991 | Karamon et al. | 386/97 |
| 5,282,186 | 1/1994 | Yoshio et al. | 369/48 |
| 5,289,288 | 2/1994 | Silveman et al. | 386/97 |
| 5,481,543 | 1/1996 | Veltman | 348/462 |

FOREIGN PATENT DOCUMENTS

| | | |
|---|---|---|
| 0381807 | 8/1990 | European Pat. Off. . |
| 0521487 | 1/1993 | European Pat. Off. . |
| 0644692 | 3/1995 | European Pat. Off. . |

OTHER PUBLICATIONS

"MPEG Technology", Sugiyama et al., pp. 161–164 (1993).

*Primary Examiner*—Georgia Y. Epps
*Assistant Examiner*—Kim-Kwok Chu
*Attorney, Agent, or Firm*—Cushman, Darby & Cushman IP Group of Pillsbury Madison & Sutro LLP

[57] ABSTRACT

A separation circuit for separating input unit data into individual sound streams; a separation circuit for separating each sound frame of the separated sound streams into a sound frame of main audio and a sound frame of multi-lingual audio; a main selection circuit for selecting one frame from a plurality of the separated main audio sound frames; a multi-lingual selection circuit for selecting one frame from a plurality of the separated multi-lingual sound frames; and a sound frame synthesis circuit for packing each sound frame selected in each of the selection circuit into a frame structure of MPEG2 audio.

18 Claims, 7 Drawing Sheets

RECORDING MEDIUM REPRODUCTION APPARATUS AND RECORDING MEDIUM REPRODUCTION METHOD FOR SELECTING, MIXING AND OUTPUTTING ARBITRARY TWO STREAMS FROM MEDIUM INCLUDING A PLURALITY OF HIGH EFFIENCY-ENCODED SOUND STREAMS RECORDED THEREON

BACKGROUND OF THE INVENTION

1. Field of the Invention

The present invention relates to a recording medium reproduction apparatus for, and a recording medium reproduction method of, reproducing a data including high efficiency-encoded audio data recorded on a medium.

2. Description of the Related Art

As high efficiency-encoding system of audio data there have been standardized MPEG1 (Moving Picture Image Coding Expert Group), MPEG2, etc. MPEG1 audio comprises audio data of two channels, and MPEG2 audio is obtained by extending the MPEG1 audio so as to be applied to a multi-channel and a multi-lingual audio.

Figure 3:
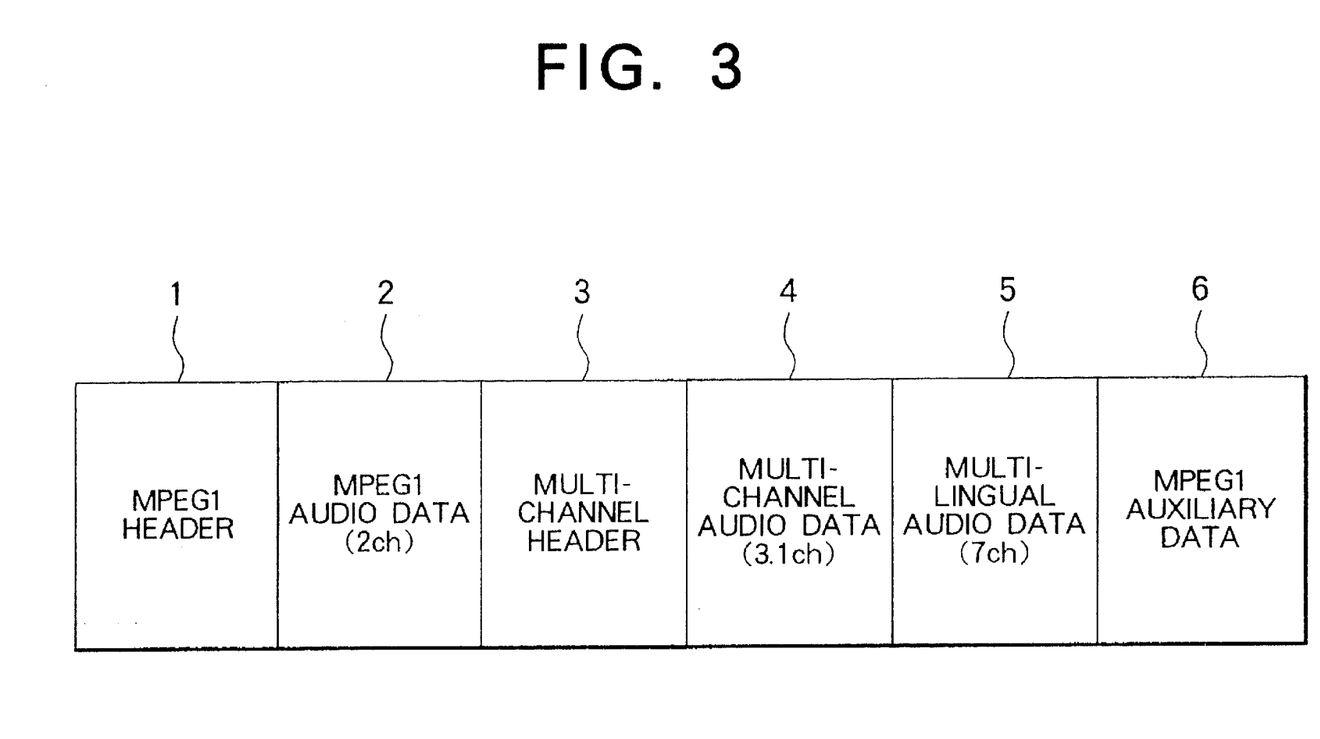
FIG. 3 is a view illustrating a frame structure of an MPEG2 audio.

FIG. 3 is a view illustrating a frame structure of the MPEG2 audio. As illustrated in FIG. 3, a frame of MPEG2 audio comprises a MPEG1 header 1, MPEG1 audio data 2, a multi-channel header 3, multi-channel audio data 4, multi-lingual audio data 5, and a MPEG1 auxiliary data 6. The MPEG1 audio data 2 is for monaural or stereo system. The multi-channel audio data 4 is for a surround system, which comprises maximum 3.1 channels of stereo surround (2 ch), center (1 ch), and sub-woofer (0.1 ch). Further, the multi-lingual audio data 5 is audio data to deal with a variety of languages, and may have a maximum of 7 channels. The frame structure of the MPEG1 audio comprises a MPEG1 header, MPEG1 audio data, and MPEG1 auxiliary data.

Some reproduction apparatuses, each for a medium on which a plurality of audio streams high efficiency-encoded with the MPEG1, the MPEG2, etc. have been recorded, have a function of selecting two streams and mixing and outputting them. In such a reproduction apparatus, from a medium on which a background sound stream of a moving picture, for example, and sound streams expressed by a plurality of languages have been recorded, the background sound stream and the sound stream of one language are selected, mixed and output.

Thereupon, in the case of the audio stream encoded with the MPEG1, audio data of the selected two streams are decoded through separate decoders, and decoded data are mixed to provide audio outputs. Accordingly, two decoders and one mixer circuit are necessary.

In contrast, in the case of the audio stream encoded with the MPEG2, multi-lingual audio data are allowed to have 7 channels as a standard, and a decoder applied to the MPEG2 audio has a mixing function therein, so that only one decoder is needed to satisfy the foregoing requirement. This is, however, actually impossible. The reason is as follows.

The maximum bit rate of the MPEG1 audio and the MPEG2 audio is 384 kbps, and hence the total of the MPEG1 audio data, multi-channel audio data, and multi-lingual audio data should fall within 384 kbps. However, because 96 kbps or higher are required for each channel in view of a sound quality, from one stream of the MPEG2 audio, the MPEG1 audio data and the multi-lingual audio data are selected, respectively, only as 192 kbps stereo data. These two stereo data correspond to a background sound and a sound of one language, so that a multi-lingual audio cannot be realized. There is a method to record a stream composed of the same background sound and a different language on a plurality of media and to reproduce one stream upon reproduction, so as to realize a multi-lingual audio. The method however causes redundancy to be increased in proportional to the number of the streams because of the background sound being the same.

For this reason, even in the case of the MPEG2 audio, a method has been applied in which two streams are selected, and audio data of these streams are decoded, mixed through separate decoders, and output. Thus, two decoders and one mixer circuit are essential.

Figure 4:
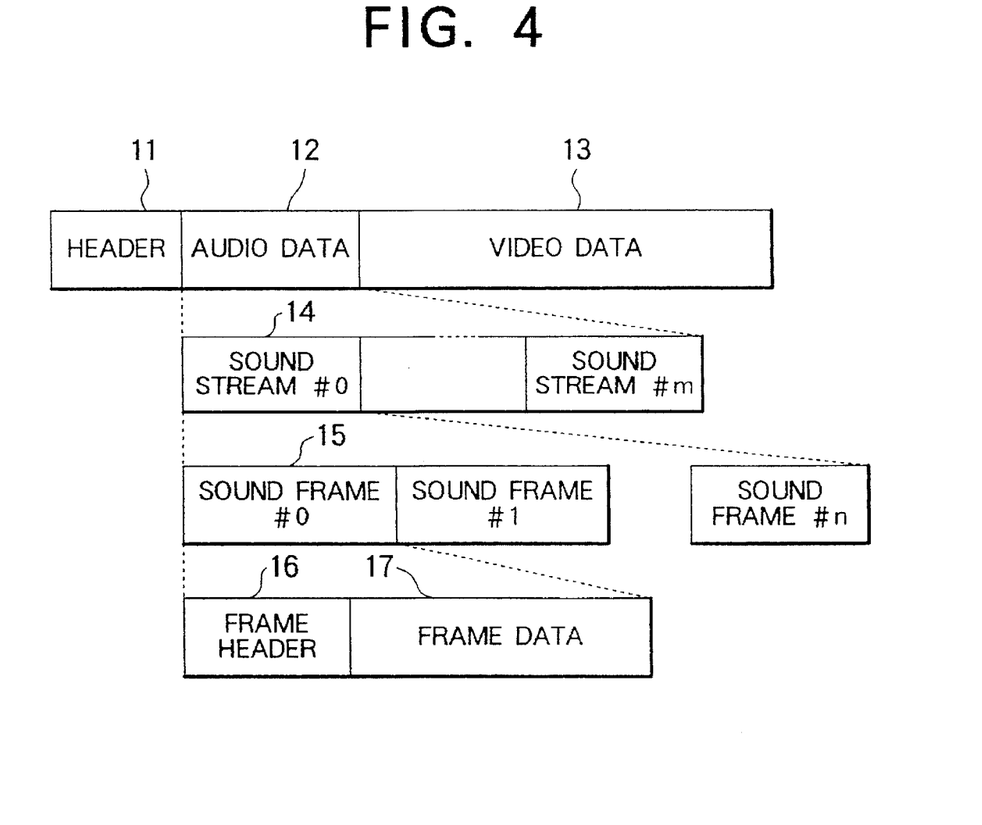
FIG. 4 is a view illustrating the structure of data recorded on a medium.

For instance, data recorded on a medium is assumed to be an assembly of units, each unit being composed of a header 11, audio data 12 and video data 13, as illustrated in FIG. 4. The audio data 12 and the video data 13 are high efficiency compression-encoded data encoded according to the MPEG standard or the like. The audio data 12 comprises a plurality (m) of sound streams (#0, . . . , #m) 14, each sound stream 14 being composed of a plurality (n) of continuous sound frames (#0, #1, . . . , #n) 15. The sound frame 15 comprises a frame header 16 and frame data 17.

Figure 6:
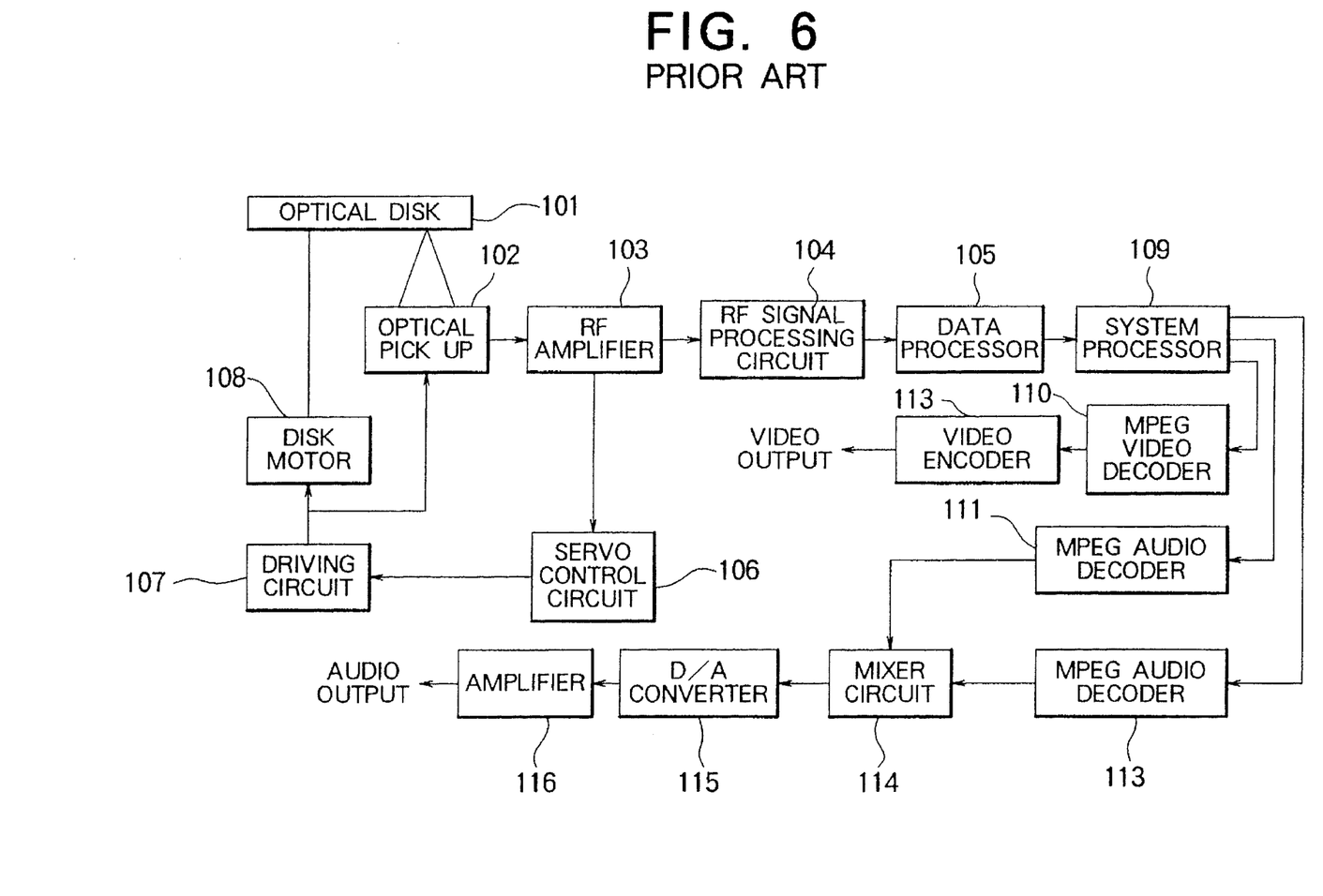
FIG. 6 is a block diagram illustrating the structure of a conventional audio reproduction apparatus.

FIG. 6 is a block diagram illustrating the structure of an optical disk reproduction apparatus for reproducing the data recorded on the optical disk. In FIG. 6, numeral 101 denotes the optical disk on which data is recorded with a structure illustrated in FIG. 4. Numeral 102 denotes an optical pickup for reading a signal recorded on the optical disk 101. The signal read by the optical pickup 102 is amplified in an RF amplifier 103 and is thereafter supplied to an RF signal processing circuit 104. The RF signal processing circuit 104 subjects the amplified signal to waveform equalization and binarization to obtain data. Binary data output from the RF signal processing circuit 104 is transmitted to a data processor 105 where the data is subjected to demodulation and error correction.

The output of the RF amplifier 103 is also transmitted to a servo control circuit 106. The servo control circuit 106 detects tracking errors and focusing errors from the output of the RF amplifier 103, and outputs both detection signals to a driving circuit 107. On the basis of both detection signals, the driving circuit 107 drives a feeding mechanism (not shown) of the optical pickup 102 for focusing control and tracking control. The servo control circuit 106 frequency-divides a synchronizing signal component extracted from the output of the RF amplifier 103, and transmits a frequency-divided signal to the driving circuit 107. The driving circuit 107 drives a disk motor 108 based upon the frequency-divided signal.

In contrast, the data subjected to the demodulation and error correction in the data processor 105 is transmitted to a system processor 109 on a data unit basis. The system processor 109 separates audio data and video data from the input data unit, and outputs the video data to an MPEG video decoder 110. The system processor 109 selects two streams among m sound streams of the audio data from the input unit data, and outputs one of the two streams to a first MPEG audio decoder 111, and the other of the same to a second MPEG audio decoder 112.

The MPEG video decoder 110 decodes the video encoded data and outputs the decoded video data to a video encoder 113. The video encoder 113 generates and outputs a video signal for reproduction from the decoded video data.

In contrast, the MPEG audio decoders 111 and 112 decode audio data for each sound frame that constitutes each sound stream, and outputs the decoded audio data to a mixer circuit 114. The mixer circuit 114 mixes the two audio data, and outputs the mixed audio data to a D/A converter 115. The mixed audio data is converted to an analog signal by the D/A converter 115, and is thereafter output through an amplifier 116 as a reproduction audio signal.

In the conventional reproduction apparatus for a medium on which a plurality of high efficiency-encoded sound streams have been recorded, two streams are selected, mixed, and output, and thereupon two decoders and one mixer circuit are required as described above. The conventional reproduction apparatus thus suffers from a problem of its being expensive.

SUMMARY OF THE INVENTION

It is an object of the present invention to provide a recording medium reproduction apparatus and a recording medium reproduction method wherein the hardware structure is simplified in the case where arbitrary two streams are selected from a medium on which a plurality of high efficiency-encoded sound streams have been recorded and mixed, and the mixed signal is output.

To achieve the above object, the present invention provides, in the first aspect thereof a recording medium reproduction apparatus for reproducing a medium on which a plurality of streams of high efficiency-encoded sound data are recorded, each of the streams being composed of a plurality of successive sound frames and including first sound data and second sound data that is different for each of the streams, the recording medium reproduction apparatus comprising: first separation unit separating the sound data read from the medium into individual streams; second separation unit separating a sound frame of each stream separated by the first separation unit into the first sound data and the second sound data; first selection unit selecting one sound data from a group of the first sound data separated by the second separation unit; second selection unit selecting one sound data from a group of the second sound data separated by the second separation unit; and synthesizing unit for synthesizing the sound data selected by the first selection unit and the second selection unit into one sound frame.

The present invention provides, in the second aspect thereof a recording medium reproduction method for reproducing a medium on which a plurality of streams of high efficiency-encoded sound data have been recorded, each of the streams being composed of a plurality of successive sound frames and including first sound data and second sound data which is different for each of the streams, the recording medium reproduction method comprising: a first separation process of separating the sound data read from the medium into individual streams; a second separation process of separating a sound frame of each stream separated by the first separation process into said first sound data and the second sound data; a selection process of selecting one sound data from a group of the first sound data separated by the second separation process; a selection process of selecting one sound data from a group of the second sound data separated by the second separation process; and a synthesis process of synthesizing each of the selected sound data into one sound frame.

The present invention provides, in the third aspect thereof a reproduction method of sound data, the reproduction method comprising: providing the first sound data and the second sound data on one sound frame among a plurality of the sound frames; providing only the second sound data that is different in the type for each sound frame on the sound frames other than the one frame among a plurality of the sound frames; separating the first sound data from the sound frame on which the first sound data and the second sound data are granted; separating the second sound data from the one sound frame among the sound frame on which the first sound data and the second sound data are provided and the plurality of sound frames on which only the second sound data is provided; and synthesizing the separated first sound data and second sound data.

According to the present invention, sound data read from a medium is separated into individual streams, and a sound frame of each separated stream is separated into first sound data and second sound data that is different for each stream. Further, one sound data is selected from a group of the separated first sound data, one sound data is selected from a group of the separated second sound data, and the selected sound data are synthesized into one sound frame.

Provided that the sound frame has a frame structure of, for example, the MPEG2 audio or the like, a synthesized sound frame can be decoded with one decoder (decoding means) applied for the MPEG2 audio. Additionally, since the decoder for the MPEG2 audio has a mixing function, the need for a mixer circuit for mixing the decoded sound data outside the apparatus is eliminated. The hardware structure is thus simplified.

The above and other objects, features and advantages of the present invention will become more apparent from the following description when taken in conjunction with the accompanying drawings in which a preferred embodiment of the present invention is shown by way of illustrative examples.

DESCRIPTION OF THE PREFERRED EMBODIMENTS

In what follows, a preferred embodiment of the present invention will be described in detail with reference to the accompanying drawings.

Figure 1:
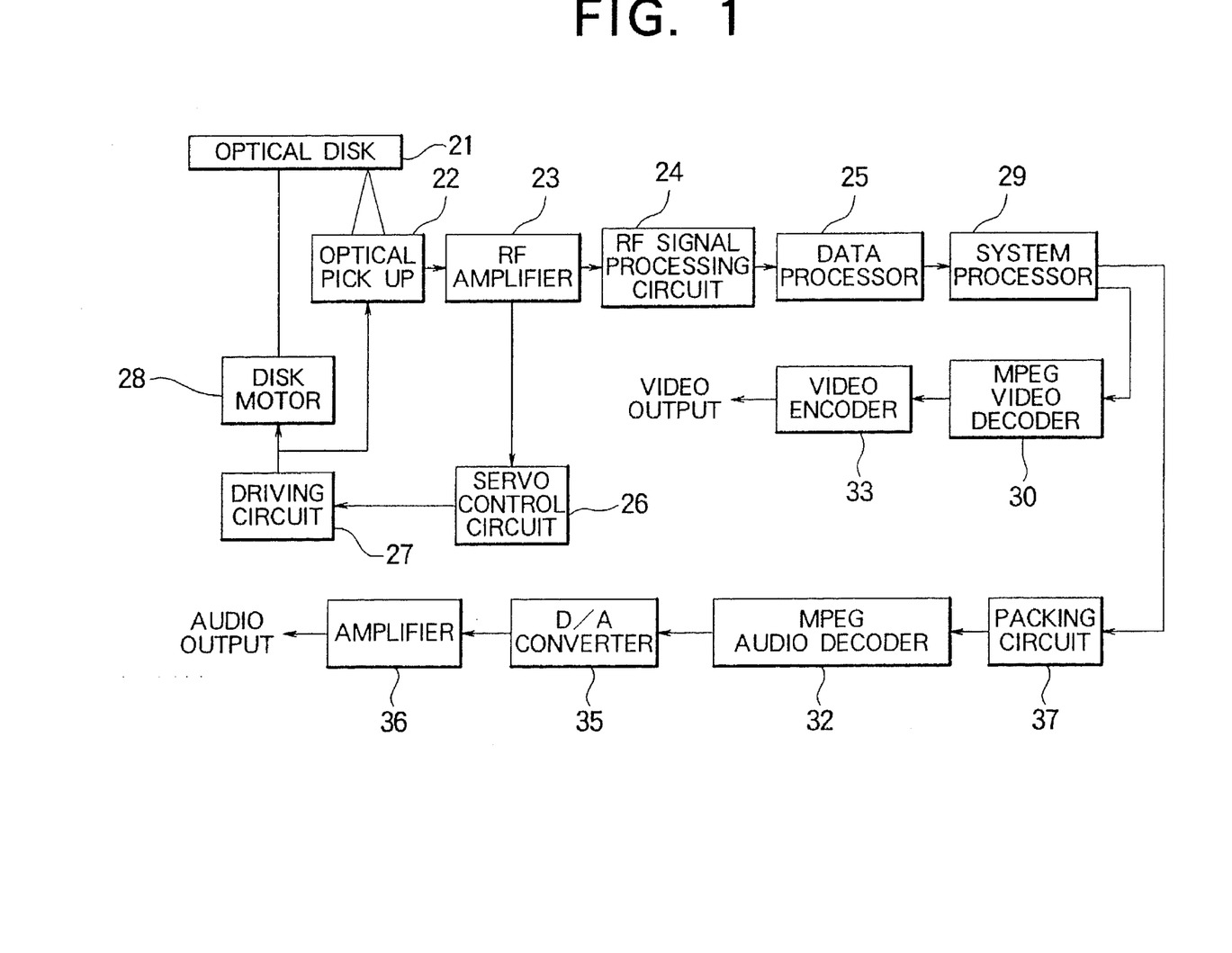
FIG. 1 is a block diagram illustrating the structure of an audio reproduction apparatus of an embodiment according to the present invention.

FIG. 1 is a block diagram illustrating the structure of an audio reproduction apparatus of an embodiment according to the present invention.

In FIG. 1, numeral 21 denotes an optical disk as a recording medium. On the optical disk 21, there is recorded data in a unit composed of header data 11, audio data 12, and video data 13, as illustrated in FIG. 4. The audio data 12 comprises a plurality (m) of sound streams 13, each sound stream 13 being composed of a plurality (n) of successive sound frames 14. The sound frame 14 comprises a frame header 15 and frame data 16. The audio data 12 is high efficiency-encoded data of, for example, the MPEG2. The frame data 16 therefore comprises an MPEG1 header 1, MPEG1 audio data 2, a multi-channel header 3, multi-channel audio data 4, multi-lingual audio data 5, and MPEG1 auxiliary data 6, as illustrated in FIG. 3.

Numeral 22 denotes an optical pickup for reading a signal recorded on the optical disk 21. The signal read by the optical pickup 22 is amplified in an RF amplifier 23 and thereafter supplied to an RF signal processing circuit 24. The RF signal processing circuit 24 subjects the amplified signal to waveform equalization and binarization to provide data. The binary data output from the RF signal processing circuit 24 is sent to a data processor 25 where it is rendered to demodulation and error correction.

The output of the RF amplifier 23 is also sent to a servo control circuit 26. The servo control circuit 26 detects tracking errors and focusing errors from the output of the RF amplifier 23, and outputs both detected signals to a driving circuit 27. The driving circuit 27 drives a feeding mechanism (not shown) of the optical pickup 22 based upon both detected signals for execution of focusing control and tracking control. The servo control circuit 26 frequency-divides a synchronizing signal component extracted from the RF amplifier 23 and transmits the frequency-divided signal to the driving circuit 27. The driving circuit 27 drives a disk motor 28 based upon the frequency-divided signal.

The data subjected to demodulation and error correction in the data processor 25 is transmitted on a data unit basis to a system processor 29. The system processor 29 separates audio data and video data from the inputted data unit, and outputs the video data to an MPEG video decoder 30 and the audio data to a packing circuit 37.

The MPEG video decoder 30 decodes the inputted video data and transmits the same to a video encoder 33. The video encoder 33 generates a video signal for reproduction from the decoded video data and outputs it.

The packing circuit 37 separates the input unit data into individual sound streams, and further separates each sound frame of the separated sound stream into sound data of a main audio and sound data of a multi-lingual audio. Herein, the main audio means the MPEG1 audio data 2 and the multi-channel audio data 4 in the frame structure of the MPEG2 audio illustrated in FIG. 3. The packing circuit 37 thereafter selects one sound data from a group of the sound data of the main audio and further selects one sound data from a group of the sound data of the multi-lingual audio, and synthesizes (packs) these data into one sound frame with a structure illustrated in FIG. 4. Details of the packing circuit 37 will be described later.

The sound frame obtained by the packing circuit 37 is sent to the MPEG audio decoder 32 and decoded therein, and thereafter the main audio and the multi-lingual audio are mixed and output to a D/A converter 35. The audio signal made an analog signal by the D/A converter 35 is thereafter output as an audio signal through the amplifier 36.

Figure 2:
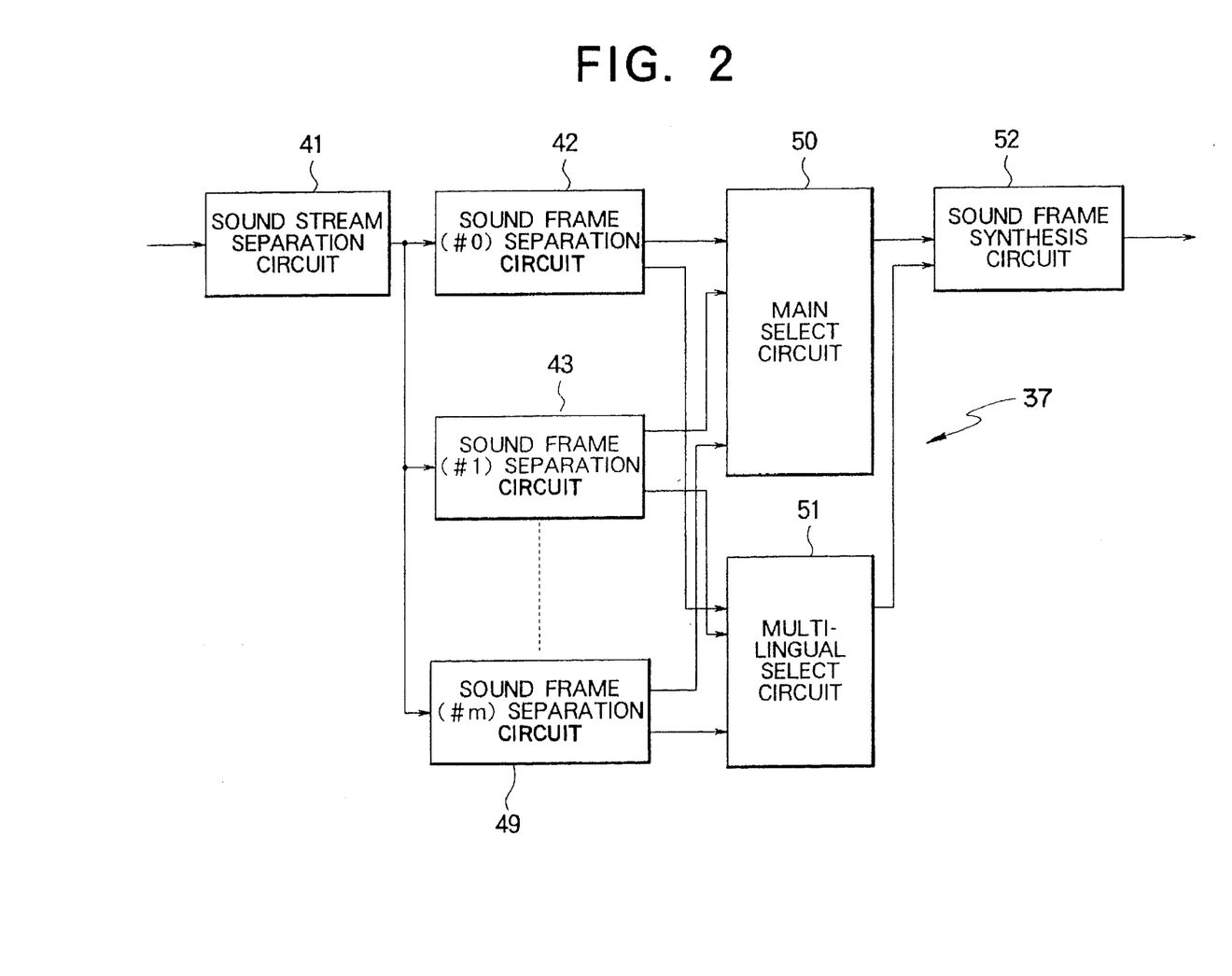
FIG. 2 is a block diagram illustrating the structure of a packing circuit in the audio reproduction apparatus illustrated in FIG. 1.

FIG. 2 is a block diagram illustrating the detailed structure of the packing circuit 37. As illustrated in FIG. 2, the packing circuit 37 comprises a sound stream separation circuit 41, m (#0-#m) sound frame separation circuits 42, 43, ..., 49, a main selection circuit 50, a multi-lingual selection circuit 51 and a sound frame synthesis circuit 52.

The sound stream separation circuit 41 separates the input unit data into m sound streams, and provides the separated m sound streams to m sound frame (#0-#m) separation circuits 42, 43, ..., 49 respectively. The sound frame (#0-#m) separation circuits 42, 43, ..., 49 separate each sound frame of the input sound stream into the sound data of the main audio and the sound data of the multi-lingual audio. The sound frame (#0-#m) separation circuits 42, 43, 49 output the sound data of the main audio to the main selection circuit 50 and the sound data of the multi-lingual audio to the multi-lingual selection circuit 51. The main selection circuit 50 selects one data from the m main audio sound data, and outputs it to the sound frame synthesis circuit 52. In contrast, the multi-lingual selection circuit 51 selects one data from the m multi-lingual audio sound data, and outputs it to the sound frame synthesis circuit 52. The sound frame synthesis circuit 52 synthesizes the sound data selected by the main selection circuit 50 and the multi-lingual selection circuit 51, and packs the synthesized sound data into the frame structure of the MPEG2 audio illustrated in FIG. 4. Upon packing, header information is also rewritten.

Figure 5:
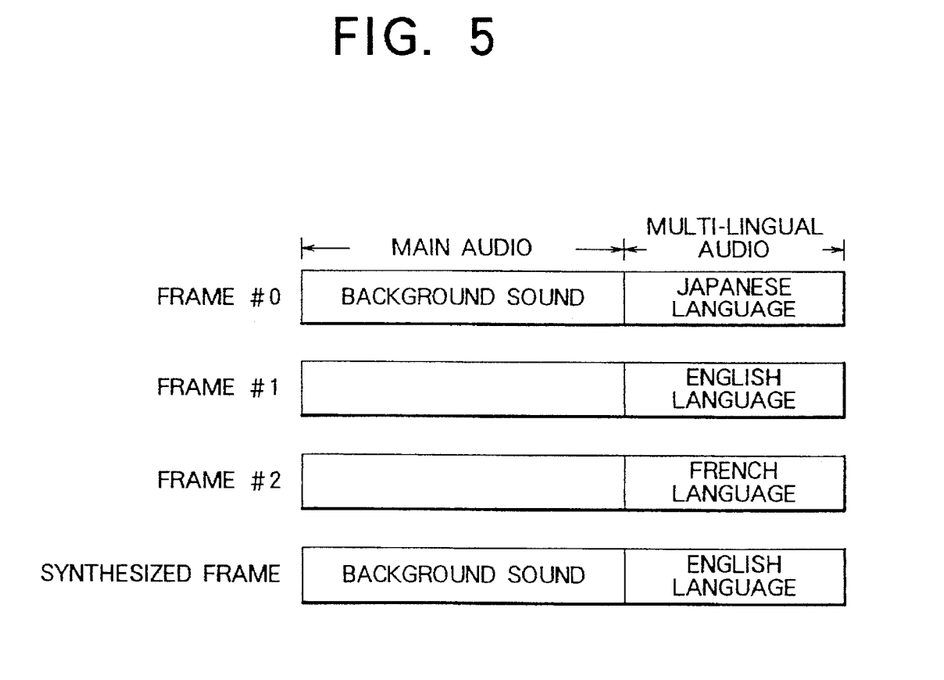
FIG. 5 is a view further concretely illustrating a frame structure according to the present invention.
Figure 7:
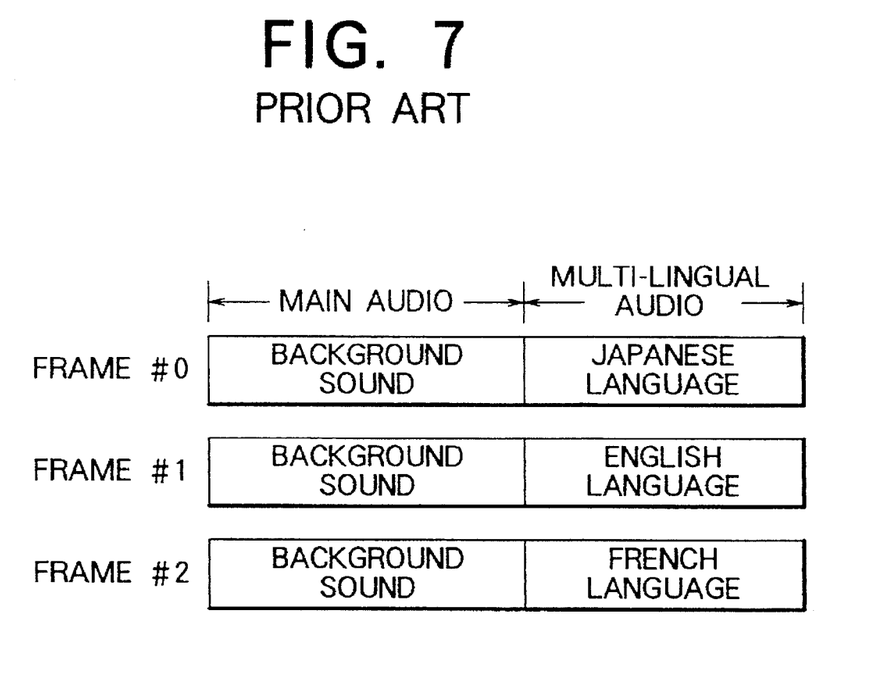
FIG. 7 is a view illustrating a conventional frame structure corresponding to FIG. 5.

As illustrated in FIG. 5 for example, the sound frame #0 has a "background sound" as the sound data of the main audio and has the "Japanese language" as the sound data of the multi-lingual audio. The sound frame #1 has no sound data of the main audio and has the "English language" as the sound data of the multi-lingual audio. The sound frame #2 has no sound data of the main audio and has the "French language" as the sound data of the multi-lingual audio. Thereupon, the main selection circuit 50 selects a "background sound" that is the sound data of the main audio of the sound frame #0 from the sound frame #0 separation circuit 42. If the "English language" detection is required, the multi-lingual selection circuit 51 selects the "English language" that is the sound data of the multi-lingual audio of the sound frame #1 from the sound frame #1 separation circuit 43. The selected "background sound" data and "English language" data are synthesized in the sound frame synthesis circuit 52 as synthesized data illustrated in FIG. 5. A conventional sound frame structure corresponding to FIG. 5 is illustrated in FIG. 7. As illustrated in FIG. 7, a conventional sound frame has a "background sound" as the sound data of the main audio.

According to the optical disk reproduction apparatus of the present embodiment, high efficiency-encoded audio data read from the medium is separated into individual sound streams, and each sound frame of each separated sound stream is separated into sound data of the main audio and the multi-lingual audio, and further one sound data is selected from the sound data of each separated main audio and the sound data of each separated multi-lingual audio respectively and the selected sound data are synthesized into a sound frame with the same frame structure as that of the MPEG2 audio, as described above. Thus, only one decoder 32 for the MPEG2 audio is required.

Further, since the decoder corresponding to the MPEG2 audio has therein a function of mixing the main audio and the multi-lingual audio both after being decoded, it is unnecessary to provide a mixer circuit outside the apparatus.

The hardware structure is thus simplified with the cost thereof reduced.

It should be noted that in the present embodiment, the decoder is unified by constructing the apparatus such that the two sound data are formed as the frame structure of the MPEG2 audio in the packing circuit 37, but the present invention is not limited thereto. Also, in high efficiency-encoding systems other than the MPEG2 for example, provided their decoder has a function of mixing the main audio and the multi-lingual audio, associated sound data may be packed into a frame structure of the high efficiency-encoding system.

According to the present invention, as described above, sound data is separated into individual streams, and sound frames associated with each separated stream are separated into first sound data and second sound data that is different for each stream, and further one sound data is selected from a group of the separated first sound data and one sound data is selected from a group of the second sound data, and the selected sound data are synthesized into one sound frame. Hereby, the synthesized sound frame can be decoded with one decoder (decoding means) for the MPEG2 audio for example. Additionally, the decoder for the MPEG2 audio has therein a mixing function, so that there is eliminated the need of provision of a mixer circuit for mixing decoded sound data outside of the apparatus. A hardware structure therefore can be simplified.

What is claimed is:

1. A recording medium reproduction apparatus for reproducing audio data recorded on a medium on which a plurality of streams of high efficiency-encoded sound data are successively recorded, each of the streams composed of a plurality of successive sound frames, each of the streams including first sound data and second sound data that is different for each of the streams, the apparatus comprising:

first separation means for separating said audio data read from said medium into said sound data streams;

second separation means for separating sound frames of each sound data stream separated by said first separation means into said first sound data and said second sound data;

first selection means for selecting one sound data from a group of said first sound data separated by said second separation means;

second selection means for selecting one sound data from a group of said second sound data separated by said second separation means; and synthesis means for synthesizing said sound data selected by said first selection means and said second selection means into one sound frame.

2. A recording medium reproduction apparatus according to claim 1, wherein said second sound data is sound data which is different in language for each of said sound data streams.

3. A recording medium reproduction apparatus according to claim 1, wherein said first sound data is recorded on only one sound frame.

4. A recording medium reproduction apparatus according to claim 3, wherein said first sound data is a background sound.

5. A recording medium reproduction apparatus according to claim 1, further comprising a decoding means for decoding said sound frame synthesized by said synthesis means.

6. A method of reproducing audio data recorded on a medium on which a plurality of streams of high efficiency-encoded sound data are successively recorded, each of the streams composed of a plurality of successive sound frames, each of the streams including first sound data and second sound data that is different for each of the streams, the method comprising:

a first separation process of separating the sound data read from said medium into individual sound data streams;

a second separation process of separating sound frames of each sound data stream separated by said first separation process into said first sound data and said second sound data;

a selection process of selecting one sound data from a group of the first sound data separated by said second separation process;

a selection process of selecting one sound data from a group of the second sound data separated by said second separation process; and a synthesis process of synthesizing each said selected sound data into one sound frame.

7. A recording medium reproduction method according to claim 6, wherein said second sound data is sound data that is different in language for each of the streams.

8. A recording medium reproduction method according to claim 6, wherein said first sound data is recorded on only one sound frame.

9. A recording medium reproduction method according to claim 8, wherein said first sound data is a background sound.

10. A recording medium reproduction method according to claim 6, wherein the apparatus further comprises a decoding process of decoding said synthesized sound frame.

11. A method of reproducing sound data comprising the steps of:

providing first sound data and second sound data on one sound frame among a plurality of sound frames and providing second sound data on another sound frame among said plurality of sound frames, said second sound data being different in type thereof for each sound frame;

separating said first sound data from said sound frame on which said first sound data and said second sound data are provided and further separating said second sound data from one sound frame among said sound frames on which said first sound data and said second sound data are provided and one sound frame among a plurality of sound frames on which said second sound data is granted; and synthesizing said separated first sound data and second sound data.

12. A sound data reproduction method according to claim 11, wherein said first sound data is a background sound.

13. A sound data reproduction method according to claim 11, wherein each of said second sound data is sound data with a different language from each other.

14. A recording medium reproduction apparatus for reproducing audio data recorded on a medium on which a plurality of streams of high efficiency-encoded sound data are successively recorded, each of the streams composed of a plurality of successive sound frames, each of the streams including first sound data and second sound data that is different for each of the streams, the apparatus comprising:

a first separation circuit separating said audio data read from said medium into said sound data streams;

a second separation circuit separating sound frames of each of said data stream separated by said first separation circuit into said first sound data and said second sound data;

a first selection circuit selecting one sound data from a group of said first sound data separated by said second separation circuit;

a second selection circuit selecting one sound data from a group of said second sound data separated by said second separation circuit; and a synthesis circuit synthesizing said sound data selected by said first selection circuit and said second selection circuit into one sound frame.

15. A recording medium reproduction apparatus according to claim 14, wherein said second sound data is sound data which is different in language for each of said sound data streams.

16. A recording medium reproduction apparatus according to claim 14, wherein said first sound data is recorded on only one sound frame.

17. A recording medium reproduction apparatus according to claim 16, wherein said sound data is a background sound.

18. A recording medium reproduction apparatus according to claim 14, further comprising a decoding circuit for decoding said sound frame synthesized by said synthesis circuit.

* * * * *

UNITED STATES PATENT AND TRADEMARK OFFICE
CERTIFICATE OF CORRECTION

PATENT NO. : 5,646,931
DATED : July 8, 1997
INVENTOR(S) : Setsuo Terasaki, et. al.

It is certified that error appears in the above-identified patent and that said Letters Patent is hereby corrected as shown below:

Column 1, line 15, delete "a";
    Column 6, line 6, after "43," insert --...,--;
        line 32, replace "detection is required" with --selection is desired--.

Signed and Sealed this

Tenth Day of February, 1998

Attest:

BRUCE LEHMAN

*Attesting Officer*      *Commissioner of Patents and Trademarks*